United States Patent
Roy et al.

(10) Patent No.: US 6,171,719 B1
(45) Date of Patent: *Jan. 9, 2001

(54) ELECTRODE PLATE STRUCTURES FOR HIGH-PRESSURE ELECTROCHEMICAL CELL DEVICES

(75) Inventors: Robert J. Roy, West Springfield, MA (US); Kurt M. Critz, Enfield; Andrei Leonida, West Hartford, both of CT (US)

(73) Assignee: United Technologies Corporation, Hartford, CT (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/969,737

(22) Filed: Nov. 13, 1997

Related U.S. Application Data

(62) Division of application No. 08/753,541, filed on Nov. 26, 1996.

(51) Int. Cl.⁷ ...................................................... H01M 8/04
(52) U.S. Cl. ................................. 429/39; 429/34; 204/284
(58) Field of Search ................................. 429/34, 39, 241, 429/243; 204/284

(56) References Cited

U.S. PATENT DOCUMENTS 5,316,644 * 5/1994 Titterington et al. ............ 429/134 X

FOREIGN PATENT DOCUMENTS

WO9634996A  11/1996 (WO).

* cited by examiner

Primary Examiner—John S. Maples
(74) Attorney, Agent, or Firm—Mary R. Bonzagni, Esq.; Holland & Bonzagni, P.C.

(57) ABSTRACT

An electrochemical cell electrode plate structure, a high-pressure electrochemical cell device, and a method for preparing such devices, are provided. The inventive electrode plate structure comprises a laminar assembly of slotted plate-shaped components that provides more uniform openings or flow passages across the active areas thereof. The inventive high-pressure electrochemical cell device comprises at least one cell made up of both slotted and unslotted plate-shaped components that are free of material deformations typically resulting from the high compressive force employed during final cell assembly. The inventive method for preparing such devices basically involves preparing at least one laminated sub-assembly comprising unslotted component layers for the purpose of consolidating such weaker layers into stronger sub-assemblies prior to a final lamination step.

2 Claims, 4 Drawing Sheets

ELECTRODE PLATE STRUCTURES FOR HIGH-PRESSURE ELECTROCHEMICAL CELL DEVICES

This is a division of copending application Ser. No. 08/753,541 filed on Nov. 26, 1996.

FIELD OF THE INVENTION

The present invention relates to electrochemical cell devices and, more particularly, relates to high-pressure electrochemical cell devices utilizing metal hardware and methods for preparing such devices.

BACKGROUND OF THE INVENTION

Electrochemical cell devices are known. These devices are typically made up of a plurality of electrochemical cells, arranged in groups or stacks, and basically serve to either: electrolytically disassociate water or another liquid into its components (i.e., electrolysis cells), or catalytically combine hydrogen or other gaseous fuel and oxygen (i.e., fuel cells), with electricity being either supplied or generated, respectively.

Each electrochemical cell, regardless of its intended use, includes an anode cavity and electrode plate, a cathode cavity and electrode plate, and an electrolyte (which can be any ionically conductive material such as an ion-exchange membrane or liquid contained in a porous matrix) positioned between at least the active area of the electrode plates. The membrane or porous matrix typically has a catalyst layer located on opposing surfaces to facilitate or enhance the electrochemical reaction.

The preferred stacking arrangement or configuration for both electrolysis and fuel cells is hydraulically in parallel, by means of fluid headers and cell manifolds, and electrically in series, by providing a full electrical path along the stacking direction. When these cells are arranged in a group or a stack, fluid cavities are defined by the electrode/electrode plate interface with the membrane on one side and a solid separator sheet at the opposite side. Bipolar assemblies are possible by joining two complementary fluid cavities at the separator sheet interface. General purpose bipolar assemblies typically contain the following sequence of components: electrolyte, electrode, electrode plate, fluid cavity with cell manifolds, separator plate, pressure pad or compensating component, separator plate, fluid cavity with cell manifolds, electrode plate, electrode, and electrolyte from the adjacent cell. Where each component has dimensional tolerances, a compensating component is useful for such multi-component hardware assemblies. As is well known to those skilled in the art, a certain degree of compression is desirable to ensure good electrical conductivity between the different components or parts in contact. This can be achieved by adjusting the overall compression loading during stack assembly. However, when the stack operating conditions are such that it could oppose the contact force, an elastic component such as a pressure pad is typically employed to maintain the minimum contact pressure required during operation. In most instances, the pressure pad also serves to compensate for the dimensional tolerances of the cell components.

Electrochemical cell assemblies or devices, especially those devices utilizing ion-exchange membranes, are best suited to be operated at very high, super-atmospheric pressures. As is well known in the art, when external pressure equalization measures are not employed during the operation of such devices, the resultant pressure differentials both within the cells and between the interior and the exterior of the electrochemical cell device impose considerable strain on the internal cell components in the cell active area and on the peripheral portions of the individual cells. In addition, high demands are placed on the fluid impermeability of the various components of the device and the interfaces therebetween. Where pressure equalization measures typically add to the complexity and cost of the equipment in addition to increasing the overall dimensions and weight of the equipment, the employment of such measures is not always feasible. Accordingly, and in addition to the pressure pad described above, means for accommodating or meeting the demands of such high-pressure operation within the cell itself have been developed for both "overboard" and "cross-cell" high pressure operation.

By way of explanation, since the cell itself contains two fluid cavities, any one or both of them could be operated at above-ambient pressure. The "overboard" pressure capability refers to a cell assembly with both fluid cavities being at essentially the same pressure above ambient. In this operating mode, there is relatively little stress imposed on the electrolyte cell component and it is the only way a cell using liquid electrolyte contained in a porous matrix could be used. Conversely, the "cross-cell" pressure capability refers to a cell assembly where one fluid cavity is at a substantially higher pressure than the other. In this operating mode, stress is exerted across the electrolyte cell component in direct proportion to the pressure difference between the two fluid cavities. "Cross-cell" pressure capability of porous matrix electrolyte structures is typically in the range of 1 kilopascal (kPa) while, properly supported polymer membrane electrolyte structures are currently capable of more than 21 megapascals (MPa) across the cell.

In particular regard to high-pressure electrochemical cell devices employing ion-exchange membranes, the anode and cathode electrode plates of such devices are usually made up of at least two plate-shaped components and are used in conjunction with finer mesh screens and/or porous sheets, that lend additional support to the membrane while allowing easy material access to and from the electrode. These high-pressure cell components are basically constructed to include a solid, fluid impervious frame of a suitable shape and size and a fluid pervious central portion bounded by the frame. The frame of each component includes a plurality of through apertures. Upon assembly of a unit cell, such apertures are aligned so as to collectively constitute fluid supply and discharge flow paths or manifolds. In addition, the frame of the plate-shaped components of the electrode plates contain channels that serve to connect the through apertures and the fluid pervious central portion.

U.S. Pat. No. 5,316,644 to Titterington et al., which is incorporated herein by reference, discloses an improved electrochemical cell electrode plate preferably made up of at least two substantially identical plate-shaped components. As described above, each component has a fluid pervious central portion and a solid frame, circumferentially surrounding the central portion, and provided with at least one through aperture. The frame is also provided with a plurality of rows of separate slots, with the slots of one of the two components partially overlapping those of the other component so as to form a passage connecting the through apertures and the central portions that dictates a tortuous path. (See, Col. 4, lines 21 to 26.)

The fluid pervious central portion or active area of each plate-shaped component of the improved electrode plate of Titterington et al. constitute a mesh or network of diamond-shaped openings. The plate-shaped components are stacked with the long dimensions of the diamonds at 90° angles relative to each other. However, it has been observed that large, through openings, formed as a result of this stacking technique, leave adjacent cell components essentially unsupported in areas. For a high differential pressure application these larger openings, while allowing adequate fluid flow passages, could result in inadequate support of vital cell components resulting in failure of the cell assembly.

In fabricating high-pressure electrochemical cell devices, bonding materials are typically applied to the solid frame or sealing surfaces of the cell components that have been pre-treated to enhance adhesion. The components are then assembled and the resulting assembly laminated, in one step, by subjecting it to elevated temperatures and pressures.

It has been observed, however, that the applied bonding materials of such laminated assemblies form grainy coatings with many microscopic voids. It has also been observed that, because of the high compressive force employed during lamination, cell components become deformed in the weaker and unsupported areas. In particular, the slot pattern of the electrode plates is clearly visible in such laminated assemblies. Where the slots connect the cell active area with the fluid manifold, a mechanical imperfection in the sealing surface makes it possible for high-pressure fluid to leak across the seal area above and below the slots into the low-pressure manifolds.

Accordingly, it is a general object of the present invention to avoid the above-referenced disadvantages of the prior art.

More particularly, it is an object of the present invention to provide a high-pressure electrochemical cell device that is capable of successfully operating at extremely high pressure for long periods of time.

It is another object to provide a high-pressure electrochemical cell device, the components of which satisfy heightened strength requirements and are free of material deformations.

It is a further object to provide a high-pressure electrochemical cell device that demonstrates improved adhesion between cell components.

It is another object to provide an electrochemical cell electrode plate structure for use in high-pressure electrochemical cell devices that provides more uniform openings for flow passages across the active areas of the electrode plates.

It is yet a further object of the present invention to provide a method for preparing a high-pressure electrochemical cell device.

SUMMARY OF THE INVENTION

The present invention therefore provides an electrochemical cell electrode plate structure that comprises a laminar assembly of at least one set of at least one first plate-shaped component and at least one second plate-shaped component. The first and second plate-shaped components of each set each comprise: a central portion having a plurality of identical or substantially identical openings or fluid-flow spaces; and a solid frame portion or sealing surface, integral with and completely surrounding the central portion, and provided with at least one through aperture and a plurality of slots that form at least one discontinuous partial channel between the aperture(s) and the central portion.

The apertures of the first and second plate-shaped components of each set in the laminar assembly are aligned to form at least one continuous fluid-flow conduit through the assembly.

The plurality of openings of the central portion of the first and second plate-shaped components in each set in the assembly are offset from each other thereby forming a plurality of reduced area, identical or substantially identical, openings or fluid-flow spaces through the respective set.

The discontinuous partial channels of the first and second plate-shaped components of each set in the assembly communicate with one another to form a continuous passage that establishes fluid communication between the apertures and the plurality of reduced area openings formed by the central portions of the components in each set in the assembly.

The present invention also provides both a method for preparing a high-pressure electrochemical cell device and a high-pressure electrochemical cell device prepared by such a method. The electrochemical cell device is made up of at least one cell that comprises a laminar assembly of plate-shaped components and an electrolyte, where a first type of plate-shaped component has sealing surfaces that are devoid of at least one interrupted row of slots.

The inventive method comprises preparing at least one laminated sub-assembly comprising the first type of unslotted components prior to preparing the final cell assembly (ies).

The foregoing and other features and advantages of the present invention will become more apparent from the following description and accompanying drawings.

BEST MODE FOR CARRYING OUT THE INVENTION

The electrode plate structures of the present invention are configured or designed to serve as either an anode or a cathode electrode plate structure and therefore can serve to effect and support an electrolytic reaction within an electrochemical cell upon the application of different electrical potentials to the plate structures, while, at the same time, providing uniform and even support to adjacent or contiguous cell components.

Figure 1A:
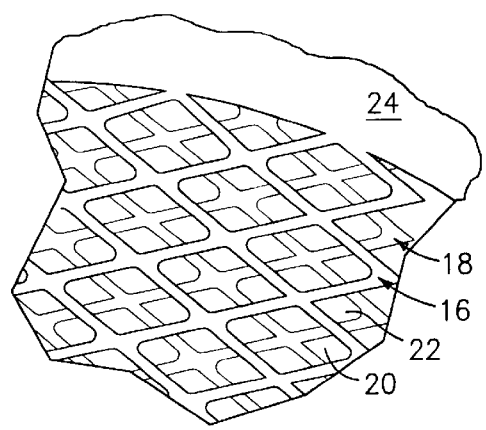
FIG. 1A is a top plan view, at an enlarged scale, of a detail 1A of FIG. 1.
Figure 1:
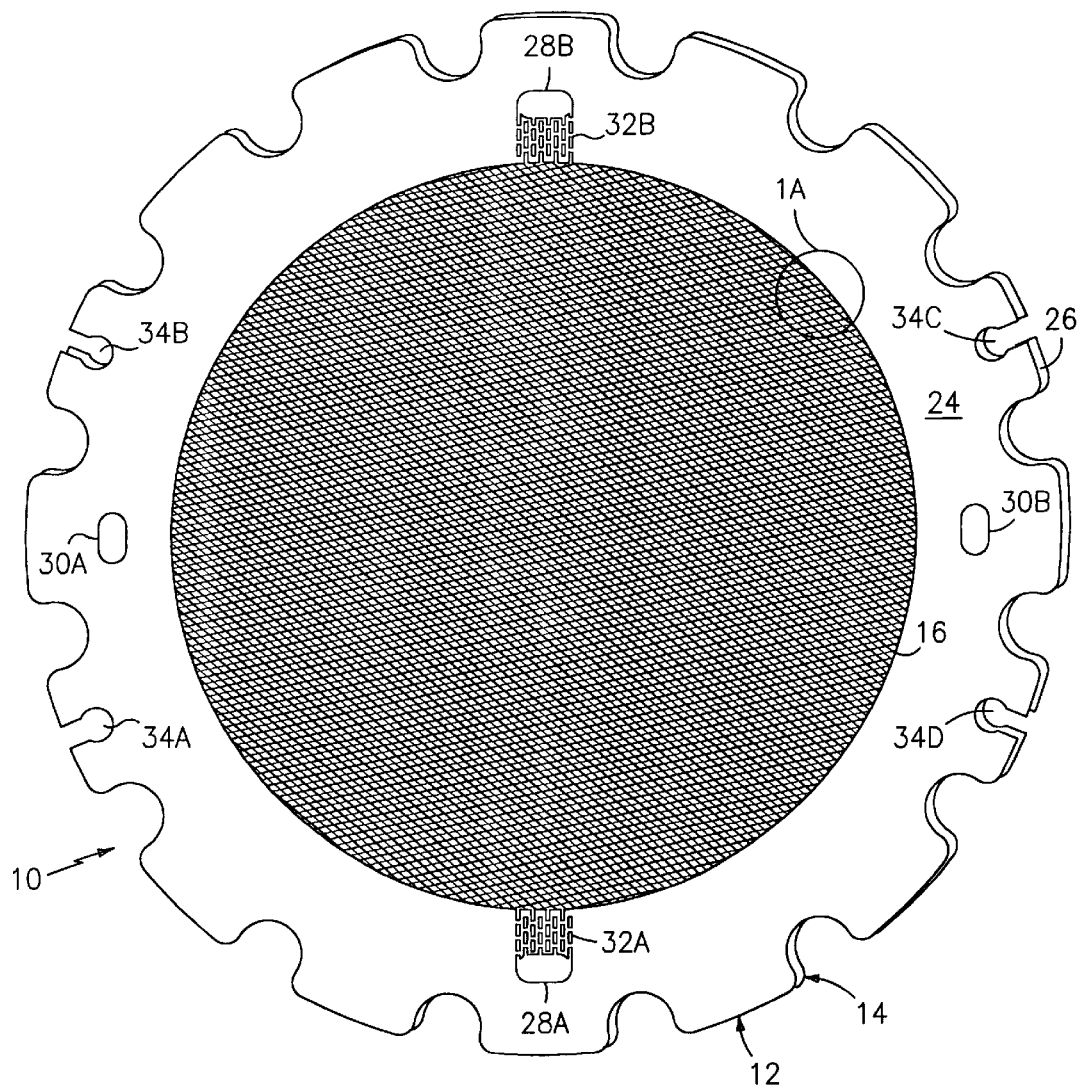
FIG. 1 is a top plan view of a preferred embodiment of the electrochemical cell electrode plate structure of the present invention that comprises a first set of a first and a second plate-shaped component.

Referring now to FIG. 1 in detail, reference numeral 10 has been used to generally designate a preferred embodiment of the electrode plate structure of the present invention.

Electrode plate structure 10 basically comprises a laminar assembly of a first set of a first and a second plate-shaped component 12, 14. The first and the second plate-shaped components 12, 14 each comprise: a central portion 16, 18 (as best shown in FIG. 1A) having a plurality of identical or substantially identical diamond-shaped openings or fluid-flow spaces 20, 22; and a solid frame portion or sealing area 24, 26, integral with and circumferentially surrounding the central portion 16, 18. For ease of reference, the solid frame portion will be further described only in reference to the first plate-shaped component 12. Solid frame portion 24 is basically provided with: one through aperture for each fluid stream; at least one row of interrupted slots (that cooperate with slots contained in an adjacent plate-shaped component) to connect an aperture to central portion 16; and at least one stacking alignment guide or assembly aid. In a more preferred embodiment, and as best shown in FIG. 1, solid frame portion 24 is provided with four through apertures 28A,B, 30A,B and two sets of eight interrupted rows of slots 32A,B that form a discontinuous partial channel between the opposing apertures 28A,B and the central portion 16. Solid frame portion 24 is further provided with four positioning holes 34A,B,C,D that serve to receive positioning pins (not shown) at least during the assembly of the inventive plate structure 10 and during the final cell assembly.

The apertures 28A,B, 30A,B of the first plate-shaped component 12 and those of the second plate-shaped component 14 are aligned to form continuous fluid-flow conduits through the plate structure 10. Apertures 30A,B, which are not connected to central portions 16, 18 by means of interrupted rows of slots, provide fluid communication to the central portion or active area of the cell on the opposite side of an electrochemical cell membrane. In an electrolytic cell, the cell membrane also serves as a fluid separator. For water electrolysis, one side contains water and hydrogen, while the other side contains water and oxygen. One pair of apertures 28A,B would therefore supply/remove fluids from one side of the membrane, while apertures 30A,B would supply/remove fluids from the other side of the membrane. In a multi-cell assembly, apertures 28A,B, 30A,B communicate from cell to cell in the stacking direction and collect individual fluid steams into one. The individual fluid streams flow to/from a base fluid plate where they are managed by an external fluid control system.

The plurality of identical or substantially identical diamond-shaped openings or fluid-flow spaces 20, 22 of the central portions 16, 18 provide fluid passage to and from the electrodes, while mechanical support and an electrically conductive path are provided by the strand-to-strand contact of the central portions 16, 18. Fluid-flow spaces 20, 22 are offset from each other in structure 10 thereby forming a plurality of reduced area, identical or substantially identical, diamond-shaped openings or fluid-flow spaces through the plate structure 10. As will be readily evident to those skilled in the art, the offset, as best shown in FIG. 1A, can be achieved by shifting the pattern of diamond-shaped openings 20 of the first plate-shaped component 12 with respect to its horizontal or vertical centerline by one quarter of the short dimension of the diamond-shaped openings 20. As will also be readily evident, when electrode plate structure 10 comprises more than two plate-shaped components, the pattern of openings of each central portion of each component would be offset with respect to the pattern of openings below and/or above it. As a result, plate structure 10 provides uniform and even support to adjacent cell components.

Figure 2:
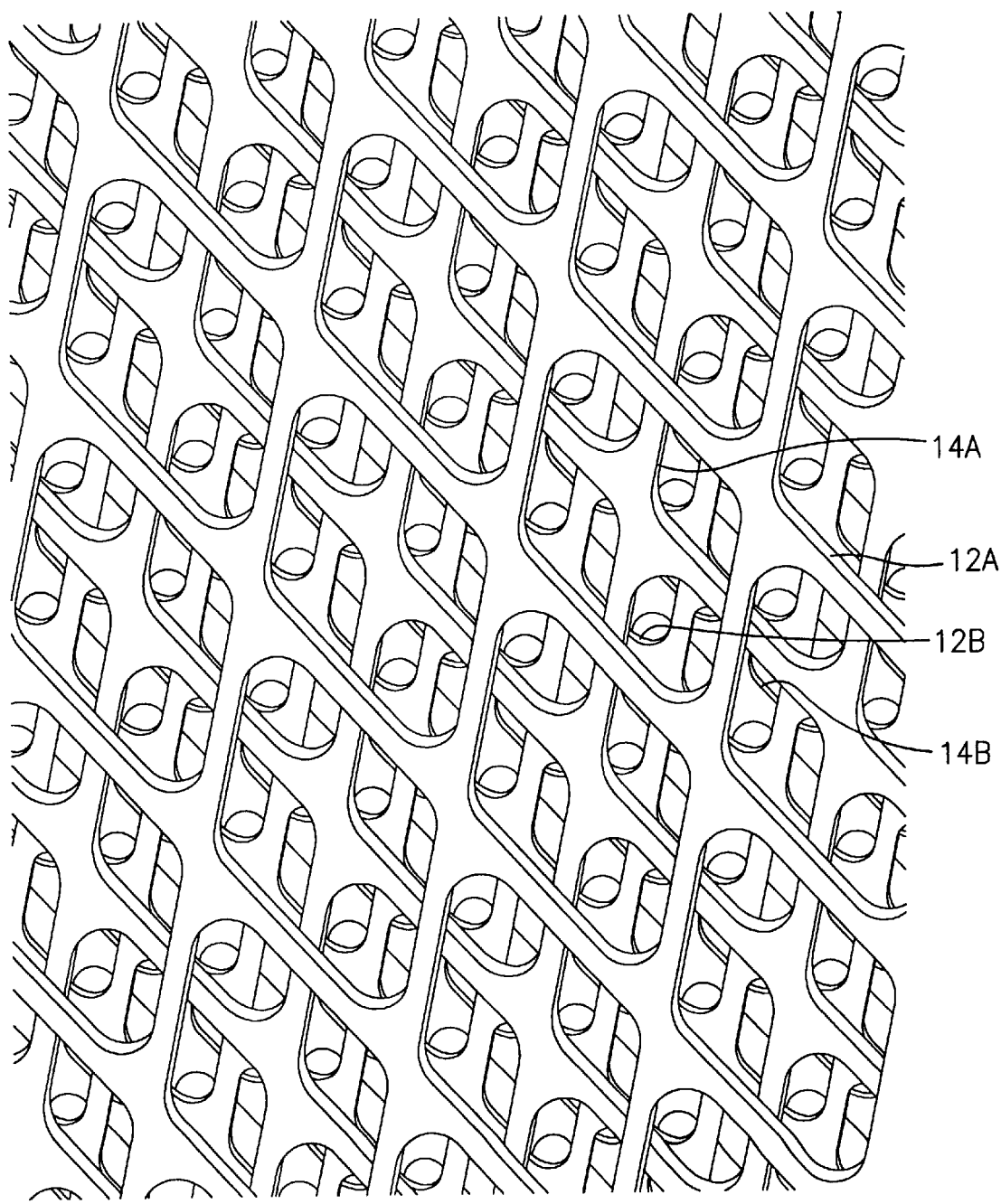
FIG. 2 is a top plan view of another preferred embodiment of the electrochemical cell electrode plate structure of the present invention that comprises a first set of first and second plate-shaped components having offset "coarse diamond" patterns and a second set of first and second plate-shaped components having offset "fine diamond" patterns.

In a more preferred embodiment and as best shown in FIG. 2, electrode plate structure 10 comprises a first set of first and second plate-shaped components 12A, 14A having offset "coarse diamond" patterns and a second set of first and second plate-shaped components 12B, 14B having offset "fine diamond" patterns. In an even more preferred embodiment the "fine diamond" pattern is exactly one-quarter the dimensions of the "coarse diamond" pattern (i.e., four "fine" diamonds have the same overall dimensions as one "coarse" diamond). The "fine diamond" patterned components 12B, 14B serve to support the electrolysis membrane while the cell is non-operational. As will be readily understood by those skilled in the art, elastic components in the cell assembly (e.g., pressure pad, porous plate) exert a force that tends to push the membrane into the central or screen portion 16, 18 of plate-shaped components 12, 14. By employing a system of fine and coarse screen patterns the membrane support structure is improved when the cell is unpressurized.

Although diamond-shaped openings or fluid-flow spaces are described hereinabove, the invention is not so limited. Any shaped opening may be employed with the present inventive electrode plate structure 10. Regular polygonal-shaped openings are preferred for their uniformity of strand width, with diamond-shaped openings being the most preferred. The size of the openings 20, 22 is governed by such considerations as fluid pressure drop laterally, as well as axially, through structure 10, and the minimum strength of the resultant cell structure required to adequately support the internal cell components. It is preferred that the size of the openings 20, 22 range from about 0.05 cm×0.10 cm to about 0.31 cm×0.61 cm.

Figure 3:
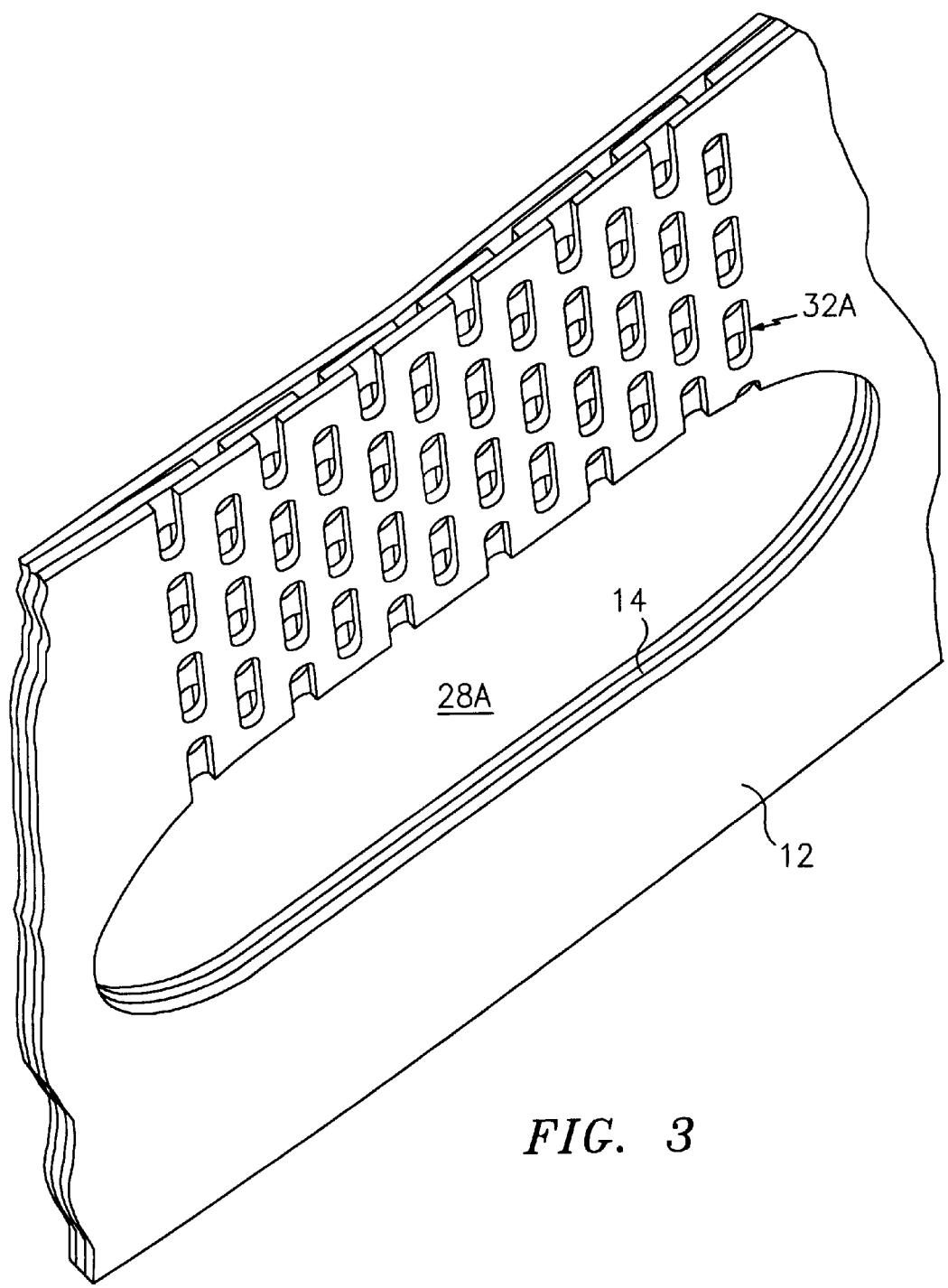
FIG. 3 is an enlarged cross-sectional view of a flow field from the aperture or fluid manifold port to the central portion or cell active area of yet another preferred embodiment of the plate structure of the present invention that comprises two first and one second plate-shaped components (the diamond pattern has been omitted from the central portion in this FIG. 3 for clarity)

As best shown in FIG. 3, the discontinuous partial channels formed by the interrupted rows of slots 32A of the first plate-shaped component 12 partially overlap the interrupted rows of slots of the second plate-shaped component 14 to form continuous passages that establish a tortuous fluid communication between the apertures (e.g., 28A) of the plate-shaped components 12, 14 and the plurality of reduced area, diamond-shaped openings formed by the central portions 16, 18 of structure 10. A more thorough description of the continuous passages formed by the discontinuous partial channels of the first and the second plate-shaped components 12, 14 can be found in U.S. Pat. No. 5,316,644, which has been incorporated herein by reference.

The electrode plate structure 10 of the present invention must satisfy certain minimum strength requirements to enable it to resist deformation during cell assembly and operation. Materials considered suitable for use in the fabrication of electrode plate structure 10 include those materials selected from the group consisting of niobium, titanium, zirconium and stainless steel.

Electrode plate structure 10 is preferably prepared or fabricated by etching metal sheets having thicknesses ranging from about 0.003 cm to about 0.15 cm. These etched metal sheets can be obtained from any photochemical etching supplier, such as Photofabrication Engineering Inc. of Milford, Mass. and Newcut, Inc. of Newark, N.Y., that has the capability to process solid polymer electrolytic cell construction materials such as titanium, zirconium and niobium. The resulting etched metal, plate-shaped components 12, 14 are then preferably vapor blasted to remove any surface oxide layer. The vapor blasted components are then platinum plated in the active areas or central portions 16, 18 and a thin layer of curable bonding material or adhesive is applied to the sealing areas or solid frame portions 24, 26.

The plate-shaped components 12, 14 of electrode plate structure 10 are preferably laminated at temperatures ranging from about 80 to about 90° C. and at pressures ranging from about 30 to about 60 MPa that are applied only to the sealing areas or solid frame portions 24, 26, for at least 4 hours.

As alluded to above, each layer or combination of layers of a high pressure electrochemical cell serves a particular purpose. In order to achieve a designated purpose or function, various features, such as screen or mesh patterns, interrupted rows of slots, and/or fluid-flow apertures, are etched into these layers.

As is well known in the art, of all the layers that make up a cell, only a few (e.g., first and second plate-shaped components 12, 14 of electrode plate structure 10) need to have interrupted rows of slots etched into them. The other layers, in addition to their respective functions, act as covers for the slots on both sides of the slotted layers.

As is also well known in the art, high pressure electrochemical cells utilizing metal hardware are typically prepared by laminating assembled layers in one step, with compressive force being applied over the entire assembly surface. In particular, a bonding material is applied to the sealing surfaces of each metal layer and is allowed to dry. The cell layers are then stacked in an assembly fixture and laminated by heating the stacked layers to a temperature ranging from 80 to 90° C. while applying a compressive force over the entire surface of the stacked layers that ranges from 30 to 60 MPa.

Due to the high compressive force employed in the lamination of such cells, unslotted layers covering rows of slots tend to deform in the unsupported areas. Since the slots connect the cell active area or central portion with the manifolds formed by the fluid-flow apertures, these mechanical imperfections make it possible for high pressure fluid to leak across the areas above and below the slots into the low pressure manifolds.

The present inventive method for preparing high pressure electrochemical cell devices serves to address this problem. The inventive method basically comprises preparing at least one laminated sub-assembly of unslotted layers that contain other functional elements required for cell operation, for the purpose of rendering a mechanically stronger component part(s) without increasing the layer thickness, prior to a final lamination step.

The present invention more specifically provides a method for preparing a high-pressure electrochemical cell device made up of at least one cell that comprises a laminar assembly of plate-shaped components and an electrolyte membrane. A first type of plate-shaped component has sealing surfaces that are devoid of at least one interrupted row of slots and a second type of plate-shaped component has sealing surfaces that include such a feature.

The inventive method more specifically comprises:

coating the sealing surface(s) of the first type of plate-shaped components with a bonding material and assembling the coated components into at least one sub-assembly;

optionally, coating the sealing surface(s) of at least two of the second type of plate-shaped components with a bonding material and assembling the coated components into at least one sub-assembly;

separately laminating the sub-assembly(ies) where pressure is applied solely to the sealing surfaces thereof, coating the sealing surface(s) of the laminated sub-assembly(ies) and of the second type of plate-shaped components with the bonding material and assembling the coated sub-assembly(ies) and plate-shaped components into final assemblies;

laminating the final assemblies, where pressure is applied solely to the sealing surfaces of the sub-assembly(ies) and plate-shaped components of the final assemblies;

pressing the laminated final assemblies between flat plates at pressures ranging from about 10 to about 60 MPa; and assembling the electrolyte membrane and pressed, laminated final assemblies to form at least one cell.

Figure 4:
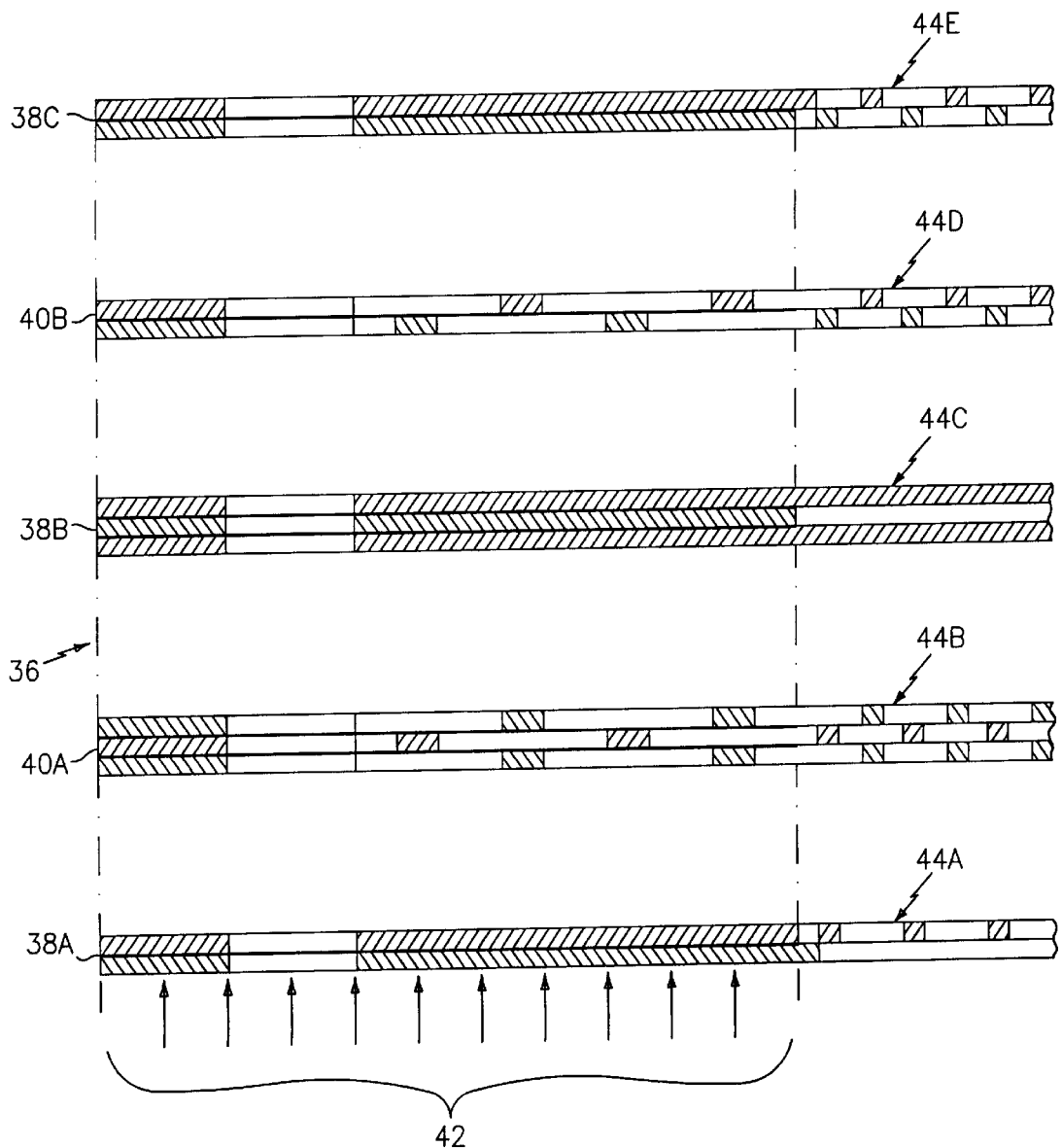
FIG. 4 is a schematic of a generic bipolar electrolysis cell assembly comprising five laminated sub-assemblies prior to a final assembly step, whereby the present inventive method is depicted.

The method of the present invention is illustrated in FIG. 4, where a generic bipolar cell structure, prior to a final coating, lamination and pressing step, is designated by the reference numeral 36. Bipolar structure 36 is made up of three unslotted sub-assemblies 38A,B,C and two slotted sub-assemblies 40A,B. During lamination of the sub-assemblies 38A,B,C, 40A,B pressure is applied solely to region 42 so as to enable central portions or active areas 44A,B,C,D,E to assume a "relaxed" configuration.

The bonding material used to coat the sealing surfaces of the plate-shaped components can be any curable bonding material capable of being applied to the component sealing surfaces to form a relatively smooth, void-free film. Examples of such materials include solutions of curable elastomers, silicones, epoxies or other adhesive materials that are compatible with the operating conditions and requirements for an operating electrolytic cell employing solid polymer electrolyte membranes.

In a preferred embodiment, a fluoroelastomeric material is used as the bonding material. One such material is sold by Lauren Manufacturing Co. of New Philadelphia, Ohio under the trade designation FLUOROLAST fluoroelastomer coating.

It is further preferred to apply such preferred bonding materials to the component sealing surfaces by: preparing a 5 to 1 diluted solution of the fluoroelastomeric material in a solvent having a relatively low volatility, such as an aliphatic ketone (e.g., methyl-isobutyl ketone), and other higher molecular weight ketones; and spraying the diluted fluoroelastomeric solution onto the sealing surfaces. The resulting coating, which preferably has a thickness ranging from about 0.003 to about 0.018 mm, is allowed to dry in air for at least 30 minutes prior to stacking the coated component part in an assembly fixture. A very thin, compact adherent coating is obtained by adjusting the solvent volatility. Longer drying times allow the coating to completely wet the surface and form a continuous film. The preferred fluoroelastomeric bonding material also serves as a dielectric insulator.

After the application of the bonding material, at least one sub-assembly(ies) made up of unslotted layers and optionally, at least one sub-assembly made up of slotted layers, are prepared and a laminating process is conducted that involves separately subjecting the sub-assembly(ies) to elevated temperatures and pressures. For sub-assemblies employing FLUOROLAST fluoroelastomer coating, it is preferred that temperatures ranging from about 80 to about 90° C. and pressures ranging from about 30 to about 60 MPa be employed for at least 4 hours to effect lamination. It is preferred that the pressure or compressive force exerted during lamination be concentrated only on the sealing surfaces, such that the central portions or active area are free to assume a "relaxed" configuration.

After the sub-assembly(ies) is laminated, the sealing surfaces of the sub-assembly(ies) and remaining plate-shaped components are coated with the bonding material and dried. Coated parts that will be positioned on one side of the electrolyte or membrane in the final cell assembly are then stacked in an assembly fixture and laminated under the conditions set forth above.

After all the layers are laminated together, the finished parts are pressed between very flat plates for about 1 to 2 minutes to assure complete setting of the components in the active area. Such a final pressing step serves to eliminate electrolyte or membrane overstressing during final cell assembly. The final pressing is typically done at 110% of the proof pressure requirement for the cell assembly, which is usually well below the compressive stress that would result in deformation of the screen layers.

After the final pressing step is completed, the membrane is assembled into the cell along with the laminated and pressed final parts.

Although this invention has been shown and described with respect to detailed embodiments thereof, it would be understood by those skilled in the art that various changes in form and detail thereof may be made without departing from the spirit and scope of the claimed invention.

Having thus described the invention, what is claimed is:

1. A high-pressure electrochemical cell device made up of at least one cell that comprises a laminar assembly of plate-shaped components and an electrolyte, wherein a first type of said plate-shaped components has sealing surfaces that are devoid of at least one interrupted row of slots, wherein said sealing surfaces of said first type of said plate-shaped components are devoid of surface deformations, wherein a second type of said plate-shaped components has sealing surfaces that include at least one interrupted row of slots, and wherein said cell(s) is prepared by a method comprising: preparing at least one laminated sub-assembly consisting of said first type of said plate-shaped components prior to preparing final laminar assemblies comprising both first and second type of said plate-shaped components and prior to assembling said final laminar assemblies and said electrolyte to form at least one cell.

2. The high-pressure electrochemical cell device of claim 1, wherein said laminar assembly comprises at least one set of said second type of said plate-shaped components, wherein each said set comprises at least one first plate-shaped component and at least one second plate-shaped component, wherein said first and said second plate-shaped components of each set each comprise: a central portion having a plurality of identical or substantially identical openings or fluid-flow spaces; and a solid frame portion, integral with and completely surrounding said central portion, and provided with at least one through aperture and a plurality of slots that form at least one discontinuous partial channel between said aperture(s) and said central portion, wherein said apertures of said first and said second plate-shaped components of each set in said laminar assembly are aligned to form at least one continuous fluid-flow conduit through said assembly, wherein said plurality of openings of said first and said second plate-shaped components of each set in said assembly are offset from each other thereby forming a plurality of reduced area, identical or substantially identical, openings or fluid-flow spaces through said set, and wherein said discontinuous partial channels of said first and of said second plate-shaped components of each set of said assembly communicate with one another to form a continuous passage that establishes fluid communication between said apertures and said plurality of reduced area openings of said central portions of said first and of said second plate-shaped components.

* * * * *